United States Patent
Couture et al.

(10) Patent No.: US 8,765,477 B2
(45) Date of Patent: Jul. 1, 2014

(54) HOT-SPOT TEMPERATURE MEASURMENT IN AN OIL CONTAINING ELECTRIC APPARATUS WITH A COMPOUND FORMING A TEMPERATURE DEPENDENT OIL SOLUBLE RESIDUE

(75) Inventors: Pierre Couture, Boucherville (CA); Michel Duval, Montrèal (CA)

(73) Assignee: Hydro-Quebec, Montreal, Quebec (CA)

( * ) Notice: Subject to any disclaimer, the term of this patent is extended or adjusted under 35 U.S.C. 154(b) by 999 days.

(21) Appl. No.: 12/866,693

(22) PCT Filed: Feb. 5, 2009

(86) PCT No.: PCT/CA2009/000137
§ 371 (c)(1), (2), (4) Date: Nov. 29, 2011

(87) PCT Pub. No.: WO2009/097684
PCT Pub. Date: Aug. 13, 2009

(65) Prior Publication Data
US 2012/0070903 A1    Mar. 22, 2012

(30) Foreign Application Priority Data
Feb. 6, 2008 (CA) ..................................... 2619920

(51) Int. Cl.
G01N 31/22 (2006.01)
G01N 25/48 (2006.01)
G01N 33/26 (2006.01)
G01K 11/12 (2006.01)
G08B 21/00 (2006.01)

(52) U.S. Cl.
USPC ............ 436/60; 340/635; 340/646; 374/106; 374/152; 374/159; 374/161; 374/162; 436/147

(58) Field of Classification Search
USPC ................. 340/635, 646; 374/106, 152, 159, 374/161–162; 436/60, 147
See application file for complete search history.

(56) References Cited

U.S. PATENT DOCUMENTS 3,848,187 A * 11/1974 Rohrback et al. ............. 324/700
4,140,999 A    2/1979 Conway
(Continued)

FOREIGN PATENT DOCUMENTS

JP    2007-298531 A2    11/2007
JP    2008-032735 A2    2/2008
WO   WO 2009/104172 A2    8/2009

OTHER PUBLICATIONS

Duval et al. "Oil Additives for the Evaluation of Hot Spot Temperature in Power Transformers During Overload Tests", IEEE Transactions on Electrical Insulation, vol. EI-17, No. 5, Oct. 1982, pp. 414-422.

*Primary Examiner* — Arlen Soderquist
(74) *Attorney, Agent, or Firm* — Merchant & Gould P.C.

(57) ABSTRACT

A method for measuring the real hot-spot temperature in an electric apparatus containing an oil, such as an electric power transformer. The electric apparatus is operated under predetermined and modifiable operating conditions. This method comprises the use of one or several chemical compounds or tracers present and soluble in the oil. Each tracer may transform, at a given temperature, in order to form a residue, such as a soluble gas. From the presence of the residue in the oil, the operator will be able to determine under which predetermined operating condition the hot-spot has been reached and to deduce the hot-spot for a given condition. Among different used compounds, there are diazoic compounds, carbonyl metals, colorants, pigments, liquid crystals and albumins. The method also allows to check the quality of the apparatus on the market and to estimate its life span.

14 Claims, 3 Drawing Sheets

(56) References Cited

U.S. PATENT DOCUMENTS

| | | |
|---|---|---|
| 4,623,265 A | 11/1986 | Poyser |
| 4,722,510 A * | 2/1988 | Kobayashi et al. ........ 252/408.1 |
| 4,761,338 A | 8/1988 | Asano et al. |
| 5,258,310 A * | 11/1993 | Abe et al. .......... 436/60 |
| 5,401,661 A * | 3/1995 | Florkowski et al. .............. 436/6 |
| 5,646,047 A * | 7/1997 | Bird et al. ..................... 436/128 |
| 6,127,185 A * | 10/2000 | Melton et al. ................... 436/60 |
| 6,276,222 B1 * | 8/2001 | Miyamoto et al. .............. 73/866 |
| 6,365,413 B1 * | 4/2002 | Hall et al. ....................... 436/60 |
| 6,494,617 B1 * | 12/2002 | Stokes et al. .................. 374/152 |
| 6,906,630 B2 * | 6/2005 | Georges et al. ............... 340/646 |
| 7,754,488 B2 * | 7/2010 | Richardson et al. ............ 436/60 |
| 8,241,916 B2 * | 8/2012 | Toyama et al. ............... 436/120 |
| 2005/0220681 A1 | 10/2005 | Chang et al. |
| 2006/0135374 A1 | 6/2006 | Cooper et al. |
| 2006/0281834 A1 | 12/2006 | Lee et al. |
| 2007/0171958 A1 * | 7/2007 | Hoang et al. .................. 374/161 |

\* cited by examiner

HOT-SPOT TEMPERATURE MEASURMENT IN AN OIL CONTAINING ELECTRIC APPARATUS WITH A COMPOUND FORMING A TEMPERATURE DEPENDENT OIL SOLUBLE RESIDUE

This application is a National Stage Application of PCT/CA2009/000137, filed Feb. 5, 2009, which claims benefit of Serial No. 2,619,920, filed Feb. 6, 2008 in Canada and which application(s) are incorporated herein by reference. To the extent appropriate, a claim of priority is made to each of the above disclosed applications.

FIELD OF THE INVENTION

The present invention relates to the field of electric apparatus and more particularly, but not exclusively, to the field of electric apparatus containing an oil, such as an electric power transformer.

The invention concerns a method and an apparatus for measuring a temperature of a hot-spot in an electric apparatus operated under predetermined and modifiable operating conditions. This method also allows to verify the quality of the particular apparatus being marketed and to estimate its life span.

DESCRIPTION OF THE PRIOR ART

The variation of temperature of an electric apparatus comprising an electromagnetic assembly in a tank comprising an oil, depends on several factors. Firstly, this variation is due to a heat loss $I^2R$ in the copper coils of the electromagnetic assembly (I being the load of current sent to the coils, or the intensity, and R the resistance of the coils), as well as to the losses within the iron metallic pieces. The temperature thus varies as a function of the load or intensity of the current required by the apparatus. Secondly, the variation may be due to the closing of air entries and of fans of the tank. Finally, the temperature inside the tank may vary as a function of external conditions such as the geographic location of the apparatus (inside a heated building or outside), and meteorological conditions (external temperature, wind, day/night).

The temperature, however, is not uniform throughout the tank. The oil present in an upper part of the tank of the apparatus is generally warmer than in the bottom. This is due to the fact that the oil is heated by passing through the coils and then rises to the upper part of the tank by the natural forces of convection.

The hot-spot is the spot in the tank which reaches the hottest temperature during the working of the transformer. This temperature must not exceed a maximum value included between about 120° C. and 160° C., and this for avoiding the formation of gas bubbles in the oil and/or the premature aging of the paper used as insulation. This maximal value depends on the type of paper used and of its moisture content.

The hot-spot inside the tank is generally found and in an approximate manner in the upper two thirds of the electromagnetic assembly and one third into the coils, but its exact location and its magnitude may vary considerably from one apparatus to another, depending on the manufacturer's design, especially under overload conditions (i.e. above the nominal load).

One may by using software and a knowledge of certain operating parameters, such as the current, the temperature of the oil at the upper and lower parts of the tank, the mean temperature of the copper used for the coils, the external temperature and others, calculate the approximate temperature of the hot-spot. But this calculation is often inaccurate and unreliable, particularly for the transformers for which the detailed conception is not well known. The "calculated temperature" of the hot-spot may be significantly different from the "real temperature" of the hot-spot for certain types of apparatus or operating conditions.

To this day, the other following techniques are used for determining the real temperature of the hot-spot:

1) the use of a thermocouple which leads to galvanic link problems;

2) the use of optical fibers which lead to problems for the localisation of the hot-spot and dielectric strength; and 3) the use of a chemical tracer dispersed in the oil, which forms gas bubbles above a given temperature.

One of the main limitations for the use of techniques 1) and 2) mentioned above resides in that the exact location of the hot-spot must be known in advance, and in the possibility that a hot-spot is not detected if it is found at an unexpected location. Another disadvantage resides in that these techniques involve the use of measuring probes and that the installation of the probes in question must be done during the manufacturing of the transformer or during a major overhaul thereof. The probes in question may also affect the dielectric strength properties of the transformer. An example of a measuring probe is described in the U.S. Pat. No. 4,140,999.

The use of a chemical tracer mentioned above at point 3) is described in the scientific publication by M. DUVAL et al., in IEEE Transactions on Electrical Insulation, Vol. EI-17, No. 5, Oct. 1982.

M. DUVAL et al. describe the use in an electric power transformer of chemical tracers comprising organic blowing agents such as 2,2'-azobis(iso-butyronitrile), azobiscyclohexane, p-toluene sulfonyl hydrazide, 4,4'-oxybis(benzene)sulfonyl hydrazide or diphenyl sulfone-3,3'-disulfohydrazide.

This technique has been principally developed as a search tool for evaluating the real temperature of hot spots comparatively to the one given by the calculation software. But, it is impractical to apply on working transformers. Indeed, as illustrated in FIG. 1 from the prior art (see FIG. 4 of the afore-mentioned document by M. DUVAL et al.) the transformer (1) must be provided with a measuring cylinder (3) installed between the security tank (5) and the transformer core (7), and this, in order to take the gas formed in the oil by the chemical tracers and measure the amount produced in order to evaluate the hot-spot. Furthermore, and this is without any doubt its prime defect, the chemical tracers used are dispersed in the form of fine powder in the oil. If they are not rapidly removed by filtration after the heating tests, they can settle with time on the isolating parts of the transformer and affect its dielectric strength properties.

Apart from abnormal load defects such as the formation of arcs and corona discharges, the temperature increase is one of the factors contributing to reduction of the life span of a transformer since this increase the aging of paper insulation.

A knowledge of the real temperature of the hot-spot is necessary for operating the transformer at the closest of its limits while remaining safe. Furthermore, this knowledge allows identifying non conforming transformers, and to estimate their approximate life span.

SUMMARY OF THE INVENTION

The present invention concerns a method for establishing hot-spot temperature $T_{PC}*$ of oil contained in an electric apparatus, according to different operating conditions of the apparatus. The method comprising:

a) operating the electric apparatus according to at least one predetermined operating condition in order to increase temperature $T_H$ of the oil, the oil comprising at least one chemical compound soluble in the oil, each compound forming in a irreversible way a residue soluble in the oil at a residue transition temperature $T_R$;

b) taking at least one sample of oil during or after step a) while measuring the oil temperature $T_H$;

c) performing an analysis of the at least one sample taken in step b) in order to determine whether or not the residue is present;

d) from the analysis of the step c), evaluating a hot spot temperature $TP_S$ under the at least one predetermined operating condition having allowed the presence of said at least residue in the sample, as being equivalent to the residue transition temperature $T_R$ of said at least one residue;

e) calculating a difference $\Delta T$ between the hot spot temperature $T_{PC}$ and the oil temperature $T_H$ under the at least one predetermined operating condition; and f) establishing that the hot spot temperature $T_{PC}^*$ according to any other operating condition of the apparatus is obtained according to the following equation:

$$T_{PC}^* = T_H^* + \Delta T;$$

$T_H^*$ being the temperature of the oil under said other operating condition.

According to a preferred aspect of the invention, the method is carried out by using only one chemical compound and under temperature equilibrium conditions. More particularly:

the step a) is carried out by using only one chemical compound soluble in the oil;

the step b) is carried out after the step a);

further to the steps c), the step d) is carried out as follows:

if the residue is present:

d1) removing the residue present in the oil;

d2) operating the apparatus according to a new operating condition in order to reduce the oil temperature $T_H$; and d3) repeating the steps b), c), d1) and d2) until there is no more residue present in the sample obtained in the step c), if the residue is absent:

d4) repeating the steps a), b) and c) until the residue is present in the sample;

and establishing operating conditions where the hot spot temperature $T_{PC}$ is equal to the transition temperature $T_R$ of the residue.

According to a second preferred aspect of the invention, the method is carried out by using only one chemical compound and outside the temperature equilibrium. More particularly:

the step a) is carried out by using only one chemical compound soluble in the oil;

the step b) is carried out during the step a) by taking at least two oil samples at different times while measuring the oil temperature $T_H$;

the step c) is carried out for each of the samples taken in the step b) in order to determine a residue concentration present in the oil;

the step d) is carried out by determining by an extrapolation, based on concentrations determined in the step c), a time $t_0$ from which the residue has started to form, the hot spot temperature $T_{PC}$ at time $t_0$ being equal to the formation temperature $T_R$ of the residue.

According to a third preferred aspect of the invention, the method is carried out by using at least two chemical compounds under temperature equilibrium conditions. More particularly:

the step a) is carried out by using at least two different chemical compounds that are soluble in the oil, each forming a residue soluble in the oil at a residue transition temperature $T_R$, the transition temperature $T_R$ for each residue being different from one another;

the step b) is carried out after the step a);

the step c) is carried as follows:

if no residue is present:

d1) repeating the steps a) to c) until at least one of said soluble residues is present in the samples that are taken;

if all the residues are present:

d2) eliminating the residues present in the oil; and d3) repeating the steps a) to c) until at least one of said soluble residues, is not present any more in the samples that are taken;

establishing operating conditions where a hot spot temperature $T_{PCest}$ is between a transition temperature $T_{R1}$ of the residue of the chemical compound having produced the residue and a transition temperature $T_{R2}$ of the residue of the chemical compound that is not present; and at the step e), calculating $\Delta T$ as being equal to $T_{PCest} - T_H$, $T_H$ being the temperature of the oil measured during a last iteration of the step a).

The present invention also concerns a device for establishing hot spot temperature $T_{PC}^*$ of an oil contained in a electrical apparatus, according to different operating conditions of the apparatus, the oil comprising at least one chemical compound soluble in the oil, each compound forming in a irreversible way a residue soluble in the oil at a transition temperature $T_R$ of the residue; the device comprising:

means for carrying out an analysis of oil sample in order to determine if the residue is present;

means for estimating a hot spot temperature $T_{PC}$ under a predetermined operating condition having allowed a presence of said at least one residue in the sample, as being equal to the transition temperature $T_R$ of said at least one residue;

means for measuring a temperature $T_H$ of the oil;

means for calculating a difference $\Delta T$ between the hot spot temperature $T_{PC}$ and the oil temperature $T_H$ under the predetermined operating condition; and means for establishing the hot spot temperature $T_{PC}^*$ of the apparatus under any other operating condition, according to the following equation:

$$T_{PC}^* = T_H^* + \Delta T,$$

$T_H^*$ being a temperature of the oil under said other operating condition.

The present invention proposes a new different method compared to the prior art in that, it is based, among other things on the use of chemical tracers soluble in the oil of the transformer about forming bubbles in the oil and comprising molecules having at least one property varying with the temperature.

Preferably, the electric apparatus is a power electric transformer. It is however important to mention that the present invention does not only apply to transformers but also to any kind of apparatus device comprising an electromagnetic set inside a tank comprising an oil.

The invention and its advantages will be better understood upon reading of the following non-restrictive description with reference to the accompanying drawings.

DESCRIPTION OF PREFERRED EMBODIMENTS OF THE INVENTION

According to a preferred embodiment of the invention, the present invention has as an object, a method for estimating the real temperature of a hot-spot within an electric apparatus. This method is carried out thanks to the introduction of a chemical compound in the oil of the apparatus. This compound is referred to hereinafter as "chemical tracer" or simply "tracer".

The invention thus also concerns a device for establishing the temperature $T_{PC}*$ of the hot-spot an oil contained in an electric apparatus, according to a given operative condition of the apparatus, the oil comprising at least one chemical compound being soluble in the oil, each compound forming a residue being soluble in the oil at a transition temperature $T_R$ of residue formation.

The device comprises means for performing an analysis of an oil sample for determining at least if the residue is present. Preferably, these means use colorimetry, dissolved gas analysis, mass spectrometry, nuclear magnetic resonance, gas or liquid chromatography, infrared spectrometry, ultraviolet spectrometry and X-ray fluorescence.

The device also comprises means for measuring the temperature $T_H$ of the oil. Preferably, these means comprise a thermometer, a thermocouple, a temperature measuring probe, or any other means known to the person skilled in the art, for measuring a temperature.

The device also comprises:
means for estimating the temperature of the hot-spot under a predetermined operating condition having allowed an occurrence of said at least one residue in the sample, as being equal to the transition temperature $T_R$ of said at least one residue;
means for calculating a difference $\Delta T$ between the hot spot temperature $T_{PC}$ and the oil temperature $T_H$ under the predetermined operating condition; and
means for establishing the hot spot temperature $T_{PC}*$ of the apparatus under any other operating condition, according to the following equation:

$$T_{PC}* = T_H* + \Delta T;$$

$T_H*$ being a temperature of the oil under said other operating condition.

Preferably, these means for performing the analysis, for estimating, for calculating and for establishing the hot-spot temperature $T_{PC}*$ may be carried out by a computer being supplied with a software and linked to a key board and a screen.

Figure 1:
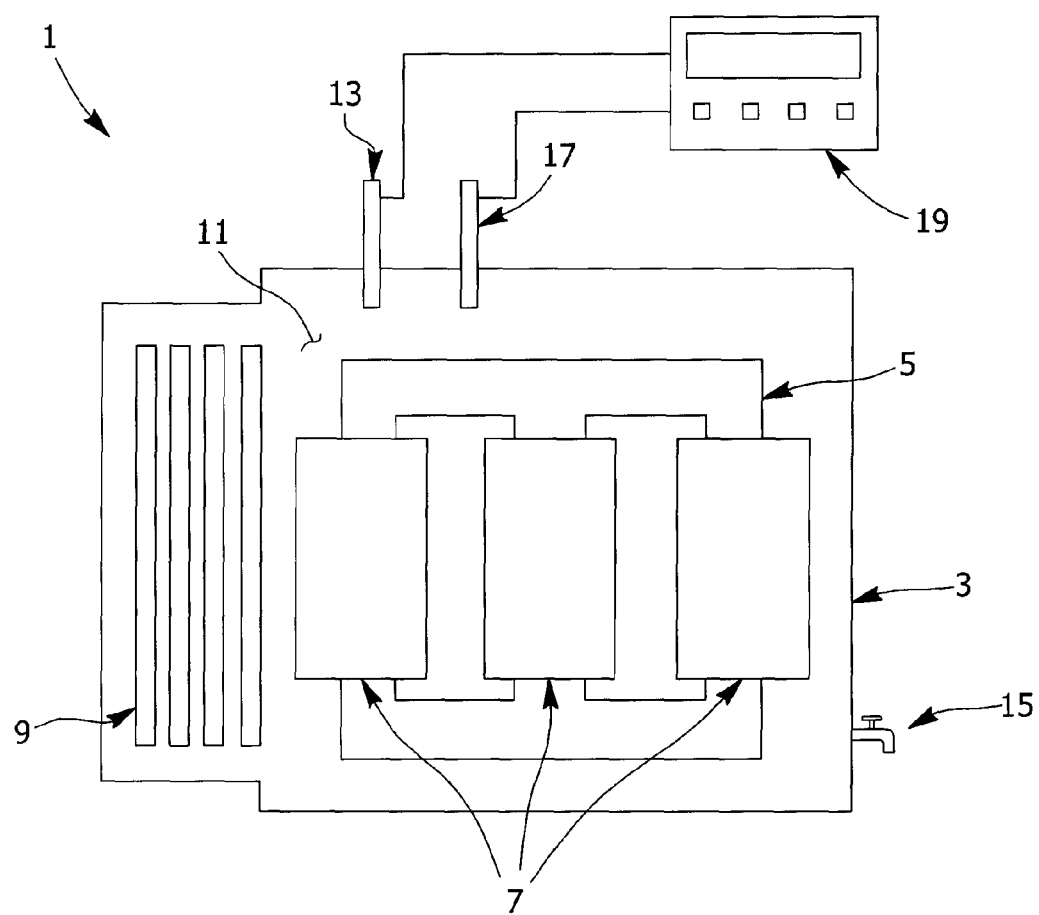
FIG. 1 is a schematic representation of an oil transformer comprising the device according to a preferred embodiment of the invention.

FIG. 1 schematically illustrates an electric apparatus (1) comprising the device according to the invention.

The apparatus (1) comprises a tank (3) comprising in its midst interior an electromagnetic assembly formed of a core (5) and coils (7).

The apparatus may also be provided with a ventilation system (9) allowing to regulate the inner temperature of the apparatus.

The enclosure or tank (3) is filled with an oil (11), such as a mineral oil.

The apparatus is also provided with a temperature measurement probe (13) allowing a constant reading of the temperature of the oil.

The bottom of the tank (3) is also provided with an opening system (15) allowing to take an oil sample or to drain the oil from the apparatus.

The apparatus (1) may also comprise another probe (17) allowing to continuously detect the presence of chemical compounds in the oil.

The different probes (13, 17) may be linked to a computer (19) in order to record the measured data and to perform the calculations allowing the determination of the hot-spot.

According to several preferred embodiments of the invention, the method comprises a series of steps to perform for determining the temperature of the hot-spot of a transformer under a given operating condition. The transformer may be new or used.

Step a):
Step a) of the method according to the invention consists in operating the electric apparatus according to at least one predetermined operating condition so as to increase the temperature $T_H$ of the oil.

The oil comprises at least one chemical compound being soluble in the oil, which is chosen in order to form a residue which is soluble in the oil at a transition temperature of the residue $T_R$.

By "operating the electric apparatus", it must be understood that the operator, in a general way, will apply a current load so as to raise or lower the temperature inside the apparatus. The speed of temperature increase is generally expressed in °C. per minute or per hour.

The operator may also carry out other operations such as applying or not a forced circulation of oil, cooling or not the oil by using radiators. These operations are established as being one or several "predetermined conditions".

Figure 2:
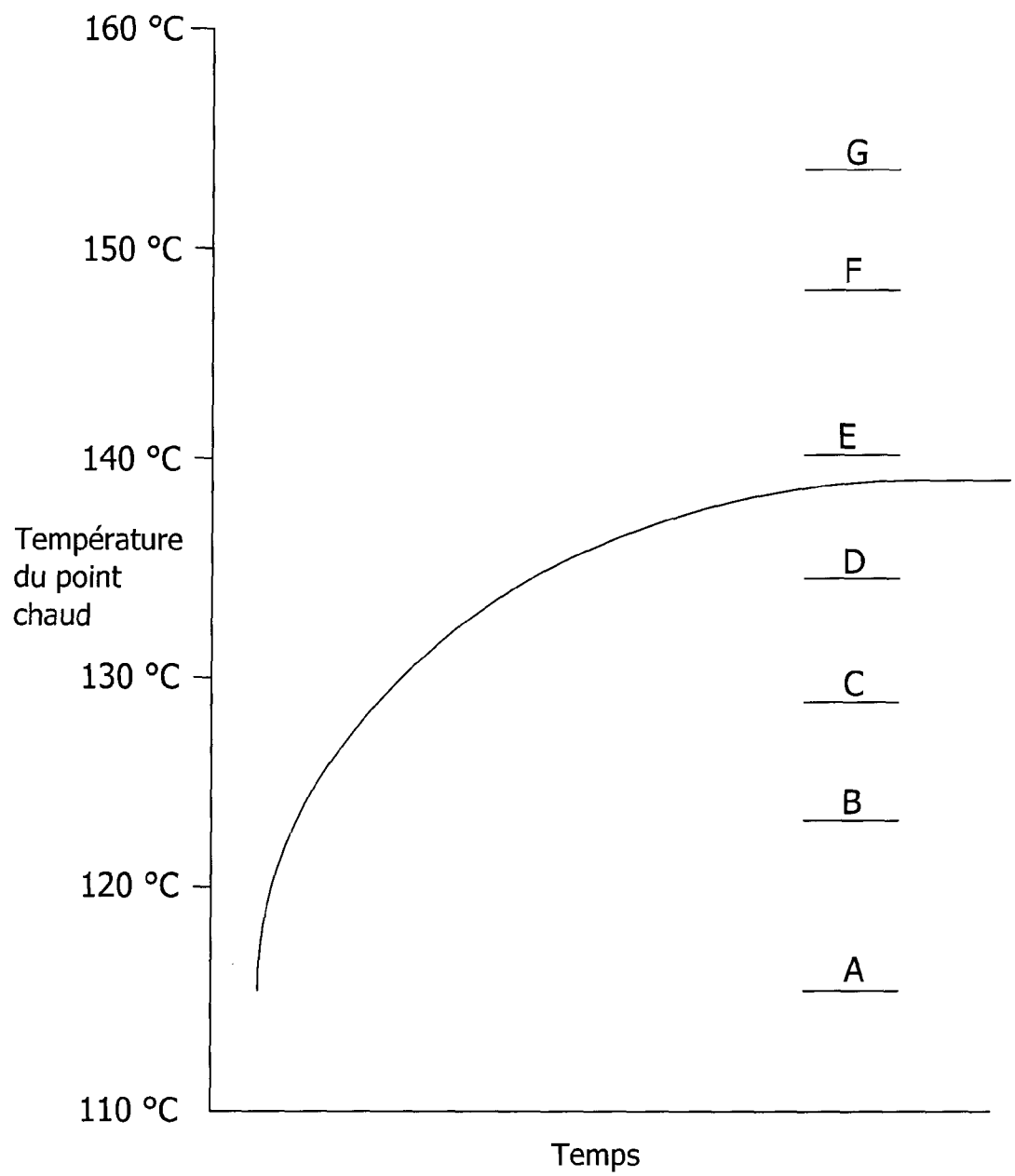
FIG. 2 is a diagram illustrating an example of the evolution of the hot-spot temperature as a function of the time of operation of the transformer, as well as examples of transition temperature of chemical tracers named A, B, C, D, E, F and G.

An example of increase in temperature of the oil as a function of time is illustrated in FIG. 2.

FIG. 2 may also illustrate an evolution curve of the calculated temperature of the hot-spot as a function of the time of operation, such as the one obtained thanks to calculation softwares taking into consideration the intrinsic parameters of the transformer under study (size, capacity in kVA or MVA, forced circulation of oil or not, etc.) or external (external temperature, wind speed, etc.). The evolution curve of the real temperature of the hot-spot may be above or below the curve of the calculated temperature.

By "operating conditions" it is understood that any action or external element leading to a variation (increase or decrease) of the temperature within the tank of the apparatus.

The operating conditions that can be predetermined, and controlled by the operator comprise preferably the value of the electric load or the current intensity requested by the apparatus. As mentioned above, the variation of temperature is mainly due to heat loss $IR^2$ (I=current intensity, R=resistance of the coils) within the copper coils.

The operating conditions also comprise the degree of opening of the air entries and the speed of the fans that allow the ventilation inside the tank. One understands that the more the speed of the fans is slow, or the more the opening of the air entries is small, then the more the internal temperature will decrease or increase, and inversely.

The operating conditions to determine also comprise external factors that are not necessarily controllable by the operator such as the geographic location (external or internal of a heated building) and the meteorological conditions when the apparatus is outside a building (external temperature, wind speed and direction, presence of light (day/night)).

Under step a), the present invention may be carried out with one, two or several chemical compounds or tracers of different types.

In order to be selected, the tracer must have a certain number of a physical and/or chemical properties well known by the operator.

The tracer must have a known temperature of reaction or of transition at which it will transform by chemical reaction or by a change of state, in order to become what we refer to hereinafter as "a residue of the chemical tracer" or simply "a residue". The residue must also be soluble in the oil.

The temperature of reaction or of transition of the tracer must be lower than the maximum temperature allowable inside the transformer.

It is understood that the "allowable maximum temperature" is a temperature at which the transformer will not be damaged and especially the paper used as insulation. This temperature is generally included between 130 and 160° C. depending on the nature of the paper used in the transformer and its humidity in service. The tracer being used comprises molecules being soluble in the oil.

More preferably, the tracer may be a compound that, at a given temperature, will form a gas soluble in the oil.

A first example of these compounds are diazoic molecules forming by decomposition of the nitrogen ($N_2$) being soluble in the oil, such as the diphenylsulfone-3,3'-disulfohydrazine or the 4,4'-oxybis(benzenesulfonyl)-hydrazine, being chemically modified. The chemical modification consists in grafting on the molecule another hydrophobe molecule, such as a long hydrocarbonated chain, preferably having from 12 to 18 carbon atoms. The presence of this hydrophobic segment of the diazoic molecule allows the molecule to be perfectly soluble in the oil.

In that case, the residue being nitrogen being soluble in the oil, a preliminary step, but optional, of the method according to the invention, may be carried out, which consists in removing from the oil a part of its air and therefore, the nitrogen contained in this air, and this, for improving the dissolution of the gas residue in the oil. The presence of nitrogen of the air dissolved in the oil would distort the determination of the nitrogen concentration derived from the transformation of the tracer into residue.

Other molecules being soluble in the oil and liberating soluble gases in the oil, like carbon monoxide or ammonia, may also be used. For example, carbonyl metals having at least one lateral hydrocarbon chain being long enough for rendering them soluble in the oil, allow the production of carbon monoxide being soluble in the oil.

The chemical compound or tracer may also be a molecule changing in color in an irreversible way at a given temperature, such as colorants or pigments.

The chemical tracer may also be a compound or molecule changing in phase in an irreversible way at a given temperature, such as liquid crystals.

The chemical tracer may also be a compound or molecule changing in chemical structure in an irreversible way at a given temperature, such as albumins.

The inventive aspect of the invention described in the present application is not limited to the chemical tracers described hereinabove.

Preferably, a suitable amount of chemical compound(s) may be introduced in the oil upon the manufacturing of the apparatus, or before the application of the method according to the invention. It must to be understood of course that this "suitable amount" depends on the following factors:
    the volume of oil present in the apparatus;
    the quality of the oil used (mineral or non mineral);
    the nature of the tracer(s) used;
    the amount of residue that can be formed; and
    the analysis technique available and used in step c) described hereinafter.

The amount of each tracer used may be expressed in weight concentration or molar concentration. Preferably, for each tracer, this concentration corresponds to the weight contained in a known weight of oil and is thus expressed in a weight concentration or in a weight percentage. A final concentration of about 0.01% to 0.1% in weight of chemical compounds in the oil, according to the type of tracer used, is typical for the application of the method according to the invention.

Step b):

Step b) of the method consists in taking at least one sample of oil during or after step a) while measuring the temperature $T_H$ of the oil.

The usual methods of oil sampling on transformers can be used (syringes, bottles or tubes). The apparatuses allowing a continuous measuring of residue of each chemical tracer without having to take oil samples such as, of example, probes for dissolved gases or colorimeters, may also be used.

As aforesaid, the temperature of the oil in the tank of the electrical apparatus is not uniform for reasons of convection flow. During the application of the method, the measurement of the oil temperature $T_H$ must be taken preferably at the same spot in the tank. The measurement of $T_H$ may however be taken anywhere in the tank but for practical reasons, it will be preferably taken at the upper part of the tank. A thermometer, a probe or other means for measuring a known temperature, may be used for measuring $T_H$.

Step c):

The step c) of the method consists in performing an analysis of the sample taken at step b) for determining if the residue is present.

According to one of the preferred embodiments of the invention, the analysis consists in measuring the concentration of the residue(s). It goes without saying that a non-detectable concentration of a residue is equivalent to the absence of residue in the sample.

All the techniques of analysis known in the art and that allow to determine the presence of a chemical compound as well as its concentration may be used for the application of the method according to the present invention.

The technique used is in function to the chemical compound chosen in step a) of the method.

Some techniques may be directly used on-site during the taking of the samples, such as colorimetry or dissolved gas analysis (DGA) performed on-site. DGA is a technique well known in the art.

Other techniques that require more complex equipment may be used in laboratory, such as for example mass spectrometry (MS), nuclear magnetic resonance (NMR), gas or liquid phase chromatography (GC, LC or HPLC), infrared or ultraviolet (UV) spectrometry (IR) or X-ray fluorescence.

The techniques that can be used are not limited to the examples mentioned above.

Step d):

From the analysis of the step c), the step d) consists in estimating if the temperature of hot-spot is equal, superior or inferior to the transition temperature of the residue(s) $T_R$.

In the case where the residue(s) expected are absent from the oil, the operator deduces that the real temperature of the hot-spot is lower than the transition temperature of the used tracer(s). Consequently, the operator may restart the method from the step a).

In the case where a residue is present, the operator deduces that the hot-spot temperature is at least equal to the transition temperature of the chemical tracer and this, by following the different preferred embodiments detailed hereinafter.

Case where Only One Tracer is Used at the Equilibrium:

Under this operating mode, only one tracer is used, one waits that an equilibrium of the oil temperature $T_H$ resulting from step a), be reached (see FIG. 2), and one carries out the analysis described in step c) for determining if the residue is present or absent.

If the residue is present, step d) may then be carried out as follows:

d1) one removes the residue present in the oil, d2) one operates the apparatus according to a new operating condition so as to reduce the oil temperature $T_H$ reached at the equilibrium (see FIG. 2), and d3) one repeats steps b), c), d1) and d2) defined above, until there is no more residue present in the sample taken in step c).

In the case where the residue(s) are in the form of gas being dissolved in the oil, step d1) will consist in degasing the oil.

If the residue is absent:

d4) one operates the apparatus according to a new operating condition so as to raise the temperature of the oil $T_H$ reached at the equilibrium, and d5) one repeats steps a), b) and c) until the residue is present in the sample taken in step c).

In both cases, one establishes the operating conditions where the hot-spot temperature $T_{PC}$ is equal to the transition temperature of the residue $T_R$.

Case where Only One Tracer is Used outside the Equilibrium:

In this operating mode, only one tracer is used but one measures the concentrations in residue during the rise of temperature of FIG. 2 and not when the equilibrium of temperature is reached. Then, one determines a time $t_0$ by extrapolation, at which the residue has started to form the hot-spot temperature $T_{PC}$ at time $t_0$ being thus equal to the transition temperature of the residue $T_R$.

Case where at Least Two Tracers are Used at the Equilibrium:

In presence of at least two tracers in the oil, step d) is carried out as follows, according to the two following cases.

If no residue is present, steps a) to c) are repeated until at least one of said soluble residues is present in the samples taken.

If all the residues are present, the residues present in the oil are eliminated and at least one iteration of steps a) to c) are repeated until at least one of said residue disappears in the samples taken.

The operating conditions are established where the hot-spot temperature $T_{PCest}$ is between the transition temperature $T_{R1}$ of the residue of the chemical compound having produced the residue and the transition temperature $T_{R2}$ of the residue of the chemical compound which has not produced a residue.

Step e):

The step e) consists in calculating a difference $\Delta t$ between:
the hot-stop temperature $T_R$ obtained at step d), whichever preferred embodiment is chosen, and
the oil temperature $T_H$ under the predetermined operating condition.

Step f):

Finally, the step f) consists in establishing that the hot-spot temperature $T_{PC*}$ according to any other given operating condition of the apparatus is obtained according to the following equation:

$$T_{PC*} = T_H^* + \Delta T$$

$T_{H*}$ being the temperature of the oil under the given operating condition.

Once the difference $\Delta T$ is measured by following the steps a) to e) of the method, the operator may deduce the hot-spot temperature $T_{PC}$ for any other operating condition by measuring the oil temperature $T_H$ corresponding to this condition. The knowledge of the value of $T_{PC}$ will allow the operator to vary the oil temperature without fear of overpassing the temperature limit allowed in the oil of the apparatus and thus, without fear of damaging the apparatus, as long as the hot-spot under these conditions will be lower to this temperature limit.

EXAMPLES

Example 1

Theoretical Use of Only One Tracer

The method according to this other preferred embodiment of the invention, that is to say the use in the oil of the transformer of only one chemical tracer may also be foreseen in the following manner:

a) selecting a tracer;
b) introducing the suitable amount of tracer in the oil of the transformer;
c) operating the transformer in order to reach a calculated hot-spot temperature at the equilibrium being slightly lower than the transition temperature of the tracer;
d) taking one sample of oil from the transformer;
e) analysing in order to demonstrate the absence of residue;
f) operating the transformer again so as to reach a calculated hot-spot temperature at the equilibrium being slightly higher than the transition temperature of the tracer;
g) taking a second sample of oil from the transformer that is analysed for determining the presence or not of the residue; and
h1) if the residue is present, deducing that the real hot-spot temperature has been reached;
h2) if the residue is not present, deducing that the real hot-spot temperature at the equilibrium has not been reached, and operating the transformer so as to further increase the hot-spot temperature, or
h3) if the residue is not formed in a sufficient amount for being detectable at the transition temperature, and requires to surpass this transition temperature in order to be detectable, or if using the tracer in a dynamic mode is preferred, then:
  i) operating the transformer so as to bring the calculated hot-spot temperature from 15 to 30° C. beyond the transition temperature;
  ii) regularly taking oil samples in order to measure the increase of the residue content;

iii) determining by extrapolation at what moment the reaction of transition has started, and thus the real hot-spot temperature at this moment; and iv) optionally, starting again the method by operating the transformer in an optimal way in order to obtain better precision on the hot-spot measurement.

Example 2

Theoretical Use of Several Tracers

The method comprises the addition to an oil of the transformer of at least two chemical tracers, each having a transition temperature different from the transition temperature of the other chosen chemical tracer and being between the ambient room temperature and the maximum allowable temperature inside the transformer.

The method thus comprises the following steps:
a) selecting several different chemical tracers;
b) introducing the chemical tracers in the oil;
c) operating the transformer during a determined period of time in order to reach the desired calculated hot-spot temperature (above or below the transition temperature of the tracers);
d) taking an oil sample from the transformer during said determined period of time; and
e) analysing the sample in order to determine the presence or not of one or several residues.

From the analysis performed in step e), the real hot-spot temperature is deduced as being between the threshold transition temperature of one of the tracers having produced a residue and the threshold transition temperature of one of the tracers not having produced a residue. Optionally, the steps c) to e) are performed again at different temperatures in order to reduce the measurement uncertainty.

This aspect of the invention may be also illustrated by FIG. 2 that represents an example of the evolution of the real or calculated hot-spot temperature as a function of time of operation of the transformer, as well as examples of transition temperatures of several chemical tracers, named A, B, C, D, E, F and G.

According to the example illustrated in FIG. 2, where the curve represents the real hot-spot temperature, the analysis of the oil of the transformer must show the presence of residues of tracers A, B, C and D, but the absence of residues for the tracers E, F and G.

This method allows to take a measurement directly in the transformer without interrupting the operation of the transformer.

The method according to the invention may also comprise a preliminary and optional step of degasing the oil in order to allow a better and/or complete dissolution of residues derived from the tracers, when said residues are gases. For example, when the residue is $N_2$ gases, the air dissolved in the oil must be removed because the air comprises a known amount of $N_2$. The presence of the nitrogen in the air being dissolved in the oil would distort the determination of the concentration derived from the transformation of the tracer into residue.

Examples 3 to 5

The three following examples were performed in the same transformer Federal Pioneer® of 100 kilovolt-amperes (KVA) and of 14.4 kV to 120 V, containing 35 gallons of insulating mineral oil Voltesso 35®. A nominal current load has been applied during 6 hrs for examples 1 and 3, and during 8 hrs for example 2.

The oil temperature at the top of the tank of the transformer at the end of the tests was of 120° C. and 135° C., respectively.

Example 3

The chosen tracer is a molecule of diphenylsulfone-3,3'-disulfohydrazine being chemically modified in order to make this molecule soluble in the mineral oil (molecule D). In order to do so, a hydrocarbon saturated lateral chain is grafted on the molecule, the chain containing 18 carbon atoms. Such a modified molecule is commercially available under special order with the company Uniroyal. Its reactive temperature or transition temperature is of 130° C. at which the molecules forms nitrogen gas $N_2$.

Initially, the oil of the transformer is partially degassed in order to eliminate the major part of air that is normally dissolved therein, until an air concentration in the oil of about 2%, is reached, such that the nitrogen formed by the decomposition of the molecule D dissolves in the oil rather than forming gas bubbles.

The amount of molecule D being introduced in the oil of the transformer is calculated such that its final concentration is of about 0.1% in weight of tracer in the oil.

Figure 3:
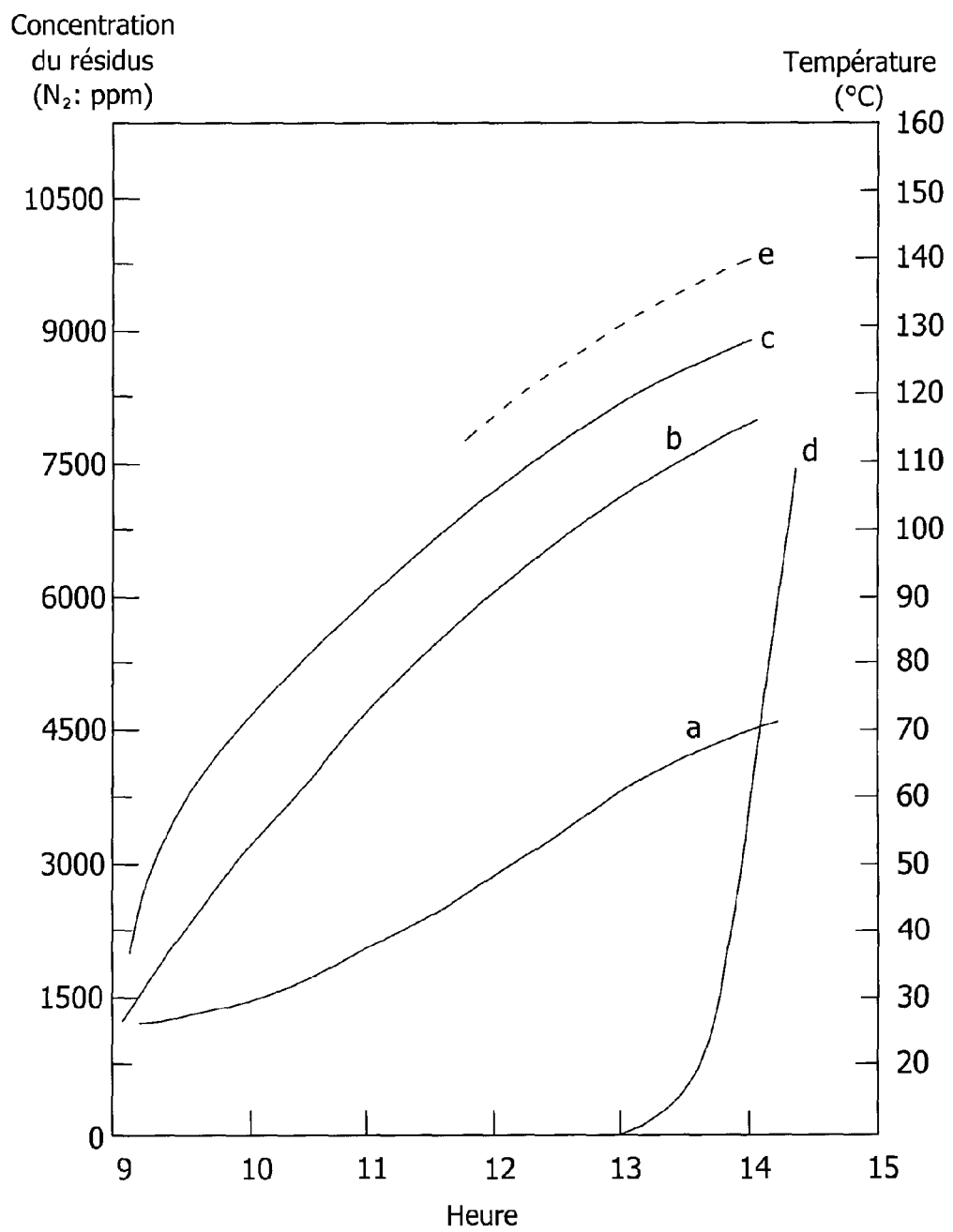
FIG. 3 is a graph illustrating the results obtained for example 3, showing the measurement of the hot-spot, and the evolution as a function of time of the temperatures within the apparatus and the concentration of the gas being dissolved in the oil.

The results are reported on FIG. 3, the illustrated curves represent:
a) the oil temperature at the bottom of the tank;
b) the oil temperature at the top of the tank;
c) the thermal converter in the oil channel coming out the windings;
d) the concentration of nitrogen $N_2$ being dissolved in the oil (in ppm);
e) the real hot-spot temperature.

A current load is given to the transformer in order to raise the oil temperature (curves a and b of FIG. 3).

Oil samples are taken during the operation and a peak of formation of the nitrogen due to the decomposition of the molecule D along the experimental curve on FIG. 3 (curve d) is detected. The technique being used is dissolved gas analysis (DGA) in laboratory.

It is deduced that at the moment of the appearance of the residue (curve d), the temperature of the hottest point in the oil of the tank is equal to the transition temperature of the residue, namely 130° C. The curve (e) of FIG. 3 shows the evolution of the real hot-spot temperature as a function of time.

Example 4

The tracer that was chosen is a molecule of 4,4' oxybis (benzenesulfonyl)hydrazine being chemically modified for rendering it soluble in mineral oil (molecule F). In order to do so, a hydrocarbon saturated lateral chain, typically containing 18 carbon atoms, is grafted on the molecule. Such a modified molecule is commercially available on special order with the company Uniroyal. The reactive temperature or transition temperature is of 150° C. at which the molecule forms $N_2$.

Initially, the oil of the transformer is partially degassed in order to eliminate the most part of the air that is normally dissolved in it, until an air content of about 2% in the oil is reached, such that the nitrogen formed by the composition of the molecule F dissolves in the oil rather than forming gas bubbles. The amount of molecule F being introduced in the oil of the transformer is calculated such that its final concentration is of about 0.1% in weight of tracer in the oil.

Gas formations similar to those illustrated in FIG. 3 have been obtained, but for higher temperatures.

Example 5

The chosen tracer is a molecule of carbonyl metal having a hydrocarbonated lateral chain (molecule G).

Its reaction or transition temperature is of 100° C., at which the molecule forms carbon monoxide (CO) being completely soluble in the oil.

The amount of molecules G being introduced in the oil of the transformer is calculated such that its final concentration is of about 0.01% in weight of tracer in the oil.

Results of gas formation similar to those indicated in FIG. 3 are obtained but at lower temperatures.

The present invention has been described hereinabove by way of preferred embodiments thereof in reference to the drawings. It should be pointed out that any modification to these preferred embodiments within the scope of the invention is not deemed to change the nature or the scope of the present invention.

The invention claimed is:

1. Method for establishing hot spot temperature $T_{PC}^*$ of oil contained in an electric apparatus, according to different operating conditions of the apparatus, the method comprising:
   a) operating the electric apparatus according to at least one predetermined operating condition in order to increase temperature $T_H$ of the oil, the oil comprising at least one chemical compound soluble in the oil, each compound forming in a irreversible way a residue soluble in the oil at a residue transition temperature $T_R$;
   b) taking at least one sample of oil during or after step a) while measuring the oil temperature $T_H$;
   c) performing an analysis of the at least one sample taken in step b) in order to determine whether or not the residue is present;
   d) from the analysis of the step c), evaluating a hot spot temperature $T_{PC}$ under the at least one predetermined operating condition having allowed the presence of said at least residue in the sample, as being equivalent to the residue transition temperature $T_R$ of said at least one residue;
   e) calculating a difference $\Delta T$ between the hot spot temperature $T_{PC}$ and the oil temperature $T_H$ under the at least one predetermined operating condition; and
   f) establishing that the hot spot temperature $T_{PC}^*$ according to any other operating condition of the apparatus is obtained according to the following equation:

$$T_{PC}^* = T_H^* + \Delta T;$$

$T_H^*$ being the temperature of the oil under said other operating condition.

2. The method according to claim 1, wherein:
   the step a) is carried out by using only one chemical compound soluble in the oil;
   the step b) is carried out after the step a);
   further to the steps c), the step d) is carried out as follows:
   if the residue is present;
      d1) removing the residue present in the oil;
      d2) operating the apparatus according to a new operating condition in order to reduce the oil temperature $T_H$; and
      d3) repeating the steps b), c), d1) and d2) until there is no more residue present in the sample obtained in the step c),
   if the residue is absent:
      d4) repeating the steps a), b) and c) until the residue is present in the sample;
   and establishing operating conditions where the hot spot temperature $T_{PC}$ is equal to the transition temperature $T_R$ of the residue.

3. The method according to claim 1, wherein:
   the step a) is carried out by using only one chemical compound soluble in the oil;
   the step b) is carried out during the step a) by taking at least two oil samples at different times while measuring the oil temperature $T_H$;
   the step c) is carried out for each of the samples taken in the step b) in order to determine a residue concentration present in the oil;
   the step d) is carried out by determining by an extrapolation, based on concentrations determined in the step c), a time $t_0$ from which the residue has started to form, the hot spot temperature $T_{PC}$ at time $t_0$ being equal to the formation temperature $T_R$ of the residue.

4. The method according to claim 1, wherein:
   the step a) is carried out by using at least two different chemical compounds that are soluble in the oil, each forming a residue soluble in the oil at a residue transition temperature $T_R$, the transition temperature $T_R$ for each residue being different from one another;
   the step b) is carried out after the step a);
   the step c) is carried as follows:
   if no residue is present:
      d1) repeating the steps a) to c) until at least one of said soluble residues is present in the samples that are taken;
   if all the residues are present:
      d2) eliminating the residues present in the oil; and
      d3) repeating the steps a) to c) until at least one of said soluble residues, is not present any more in the samples that are taken;
   establishing operating conditions where a hot spot temperature $T_{PCest}$ is between a transition temperature $T_{R1}$ of the residue of the chemical compound having produced the residue and a transition temperature $T_{R2}$ of the residue of the chemical compound that is not present; and
   at the step e), calculating $\Delta T$ as being equal to $T_{PCest} - T_H$, $T_H$ being the temperature of the oil measured during a last iteration of the step a).

5. The method according to claim 1, wherein the electric apparatus is an electric power transformer.

6. The method according to claim 1, wherein the at least one chemical compound, at a given temperature, is:
   a compound that forms a soluble gas in the oil;
   a compound changing of color in an irreversible way;
   a compound that changes of phase in an irreversible way; or
   a compound changing of chemical structure in an irreversible way.

7. A method according to claim 1, wherein the at least one chemical compound is diazoic compound, a carbonyl metal, a coloring compound, a pigment, a liquid crystal or an albumin.

8. The method according to claim 7, wherein the at least one chemical compound is a diazoic compound, the residue then formed is nitrogen soluble in the oil, the method then comprising a step preliminary to the step a) consisting in carrying out degassing of the oil to eliminate dissolved air from the oil.

9. The method according to claim 8, wherein the at least one chemical compound is selected from the group consisting of diphenylsulfone-3,3'-disulfohydrazine and 4,4'-oxybis (benzenesulfonyl)hydrazine chemically modified in order to be soluble in the oil.

10. A device for establishing hot spot temperature $T_{PC}*$ of an oil contained in a electrical apparatus, according to different operating conditions of the apparatus, the oil comprising at least one chemical compound soluble in the oil, each compound forming in a irreversible way a residue soluble in the oil at a transition temperature $T_R$ of the residue; the device comprising:

means for carrying out an analysis of an oil sample in order to determine if the residue is present;

means for estimating a hot spot temperature $T_{PC}$ under a predetermined operating condition having allowed a presence of said at least one residue in the sample, as being equal to the transition temperature $T_R$ of said at least one residue;

means for measuring a temperature $T_H$ of the oil;

means for calculating a difference $\Delta T$ between the hot spot temperature $T_{PC}$ and the oil temperature $T_H$ under the predetermined operating condition; and means for establishing the hot spot temperature $T_{PC}*$ of the apparatus under any other operating condition, according to the following equation:

$$T_{PC}* = T_H* + \Delta T,$$

$T_H*$ being a temperature of the oil under said other operating condition.

11. The device according to claim 10, wherein said means for carrying out the analysis of the oil sample are means for measuring a concentration of each residue present in the oil.

12. The device according to claim 10, wherein said means for performing the analysis of the oil sample are selected from the group consisting of colorimetry, dissolved gas analysis, mass spectrometry, nuclear magnetic resonance, gas or liquid phase chromatography, infrared spectrometry; ultraviolet spectrometry and X-ray fluorescence.

13. The device according to claim 10, wherein said means for measuring the temperature of the oil comprise a thermometer, a thermocouple, or a temperature measuring probe.

14. The device according to claim 13, wherein said means for carrying out the analysis, said means for estimating, said means for calculating and said means for establishing the hot spot temperature $T_{PC}*$ are carried out by a computer supplied with a software and linked to a keyboard and a screen.

* * * * *